Patented Nov. 1, 1949

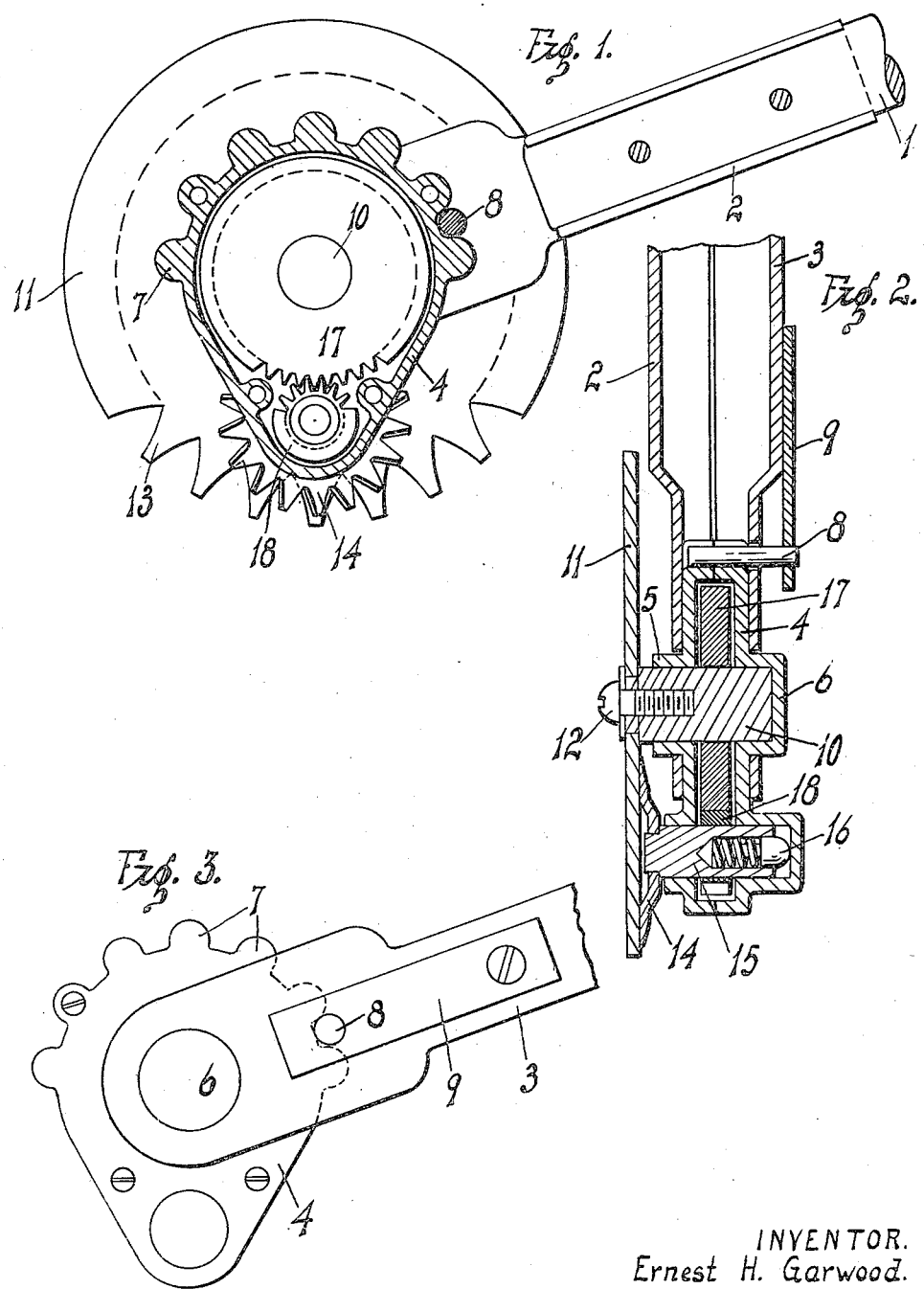

2,486,640

UNITED STATES PATENT OFFICE 2,486,640

LAWN EDGER

Ernest H. Garwood, Long Beach, Calif.

Application August 3, 1946, Serial No. 688,375

7 Claims. (Cl. 56—256)

This invention relates to a lawn edger with which grass is cut at the edge of a lawn and adjacent to walks, paths, and the like.

An object of my invention is to provide a novel lawn edger, including two toothed disks, operating in gear relation, the grass being cut between the teeth of the two disks.

Another object is to provide a novel lawn edger, the larger toothed disk being rotated by frictional engagement with the walk or ground, and a smaller toothed disk, gear driven from the larger disk.

And a further object is to provide a large cutting surface due to the geared relation of the disks.

Still another object is to provide a novel lawn edger of the character stated, in which the handle is adjustable angularly with relation to the disks.

Other objects, advantages and features of invention may appear from the accompanying drawing, the subjoined detailed description and the appended claims.

In the drawing:

Figure 1 is a sectional side elevation of my lawn edger.

Figure 2 is a transverse sectional view of the same.

Figure 3 is a side elevation of the hub and handle mount.

Referring more particularly to the drawing, the numeral 1 indicates a handle which is grasped by the operator to operate the edger. A pair of metal prongs 2—3 are fastened to the handle 1 at the lower end thereof, and one prong is secured on each side of the handle. A central hub or housing 4 is formed with bosses 5—6. The prongs 2—3 are journaled on the bosses 5—6, and the handle 1 may rotate about these bosses into various adjusted positions.

A plurality of spaced lugs 7 are formed on the upper face of the hub 4, and the prongs 2—3, together with the handle 1, may be moved arcuately around the bosses 5—6, by placing the pin 8 between any of the lugs 7, thus adjusting the handle if desired. The pin 8 is mounted on a spring 9, which is attached to the prongs 3, and this spring holds the pin in engaging position. It is obvious that with this arrangement, the handle 1 can be moved so as to provide either right hand or left hand edger.

A trunnion 10 is journaled in the bosses 5—6 and protrudes from one side of the hub 4. A toothed disk 11 is fixedly attached to the trunnion 10 by suitable means, such as the stud 12. It is to be noted that the cutting sides of the teeth 13 are all curved and both sides of the teeth are identical, thus providing a disk which will cut when rotating in either direction. A second toothed disk 14 is fixedly attached to a trunnion 15, said trunnion being journaled in the lower part of the hub 4. The disk 14 bears against the inner face of the disk 11 and the disk 14 is slightly cupped. The purpose of this construction is to permit only the toothed portion of the disk to engage the face of the disk 11, thereby reducing friction and further providing a spring action, which will insure the proper cutting of the grass between the teeth of the two disks.

A spring pressed button 16 is mounted in the trunnion 15, and bears against the hub 4, thus pressing the disk 14 against the disk 11. A gear 17 is fixedly attached to the trunnion 10, and this gear meshes with a smaller gear 18, the latter gear being attached to the trunnion 15. Thus, the trunnions 10—15 are geared together and consequently the disks 11 and 14 will rotate in geared relation. The disk 14 will rotate faster than the disk 11 and consequently an effective cutting action is achieved. The teeth of the disk 11 will engage the ground or the grass and will rotate as the operator pushes the edger along. The grass will move upwardly between the teeth 13 and will be cut off by the teeth of the disk 14. Due to the spring pressure of the disk 14 and also the higher rate of speed of the disk relative to the disk 11, the teeth of the disks will be self cleaning, and will not clog up with grass and other particles.

Having described my invention, I claim:

1. A lawn edger comprising a handle, a rotary toothed disk, means journaling said disk, a second toothed disk, means journaling said second disk, said second disk being smaller in diameter than the first named disk, meshing gear means on both of said disks whereby the last named disk is rotated by the first named disk, at a greater rate of speed than the first named disk, and means to arcuately adjust said handle relative to said disks, said adjustment extending on both sides of the vertical position of the handle.

2. A lawn edger comprising a handle, a hub, a toothed disk journaled on the hub, a second toothed disk journaled on the hub, said second disk being of smaller diameter than the first named disk, and bearing against one face of said first named disk, and gear means connecting said disks, whereby they are rotated in unison and in geared relation, and spring means pressing the last named disk against the first named disk.

3. A lawn edger comprising a handle, a hub, a toothed disk journaled on the hub, a second toothed disk, journaled on the hub, said second disk being of smaller diameter than the first named disk, and bearing against one face of said first named disk, and gear means connecting said disks, whereby they are rotated in unison and in geared relation, and means arcuately adjusting said handle on the hub.

4. A lawn edger comprising a handle, a hub, means journaling the handle on the hub, spaced lugs on the hub, a pin on the handle adapted to lie between adjacent lugs, whereby the handle is held in adjusted position, a trunnion journaled in the hub, a toothed disk mounted on the trunnion, a second trunnion journaled in the hub, a second toothed disk mounted on the second trunnion, said second disk bearing against the first named disk, and a gear on each of said trunnions, said gears meshing, whereby said disks are rotated in geared relation.

5. A lawn edger comprising a handle, a hub, means journaling the handle on the hub, spaced lugs on the hub, a pin on the handle adapted to lie between adjacent lugs, whereby the handle is held in adjusted position, a trunnion journaled in the hub, a toothed disk mounted on the trunnion, a second trunnion journaled in the hub, a second toothed disk mounted on the second trunnion, said second disk bearing against the first named disk, and a gear on each of said trunnions, said gears meshing, whereby said disks are rotated in geared relation, said second disk being cup shaped.

6. A lawn edger comprising a handle, a hub, means journaling the handle on the hub, spaced lugs on the hub, a pin on the handle adapted to lie between adjacent lugs, whereby the handle is held in adjusted position, a trunnion journaled in the hub, a toothed disk mounted on the trunnion, a second trunnion journaled on the hub, a second toothed disk mounted on the second trunnion, said second disk bearing against the first named disk, and a gear on each of said trunnions, said gears meshing, whereby said disks are rotated in geared relation, and a spring pressed pin in said second trunnion, said pin bearing against the hub, whereby the second disk is pressed against the first disk.

7. A lawn edger comprising a handle, a hub, means journaling the handle on the hub, spaced lugs on the hub, a pin on the handle adapted to lie between adjacent lugs, whereby the handle is held in adjusted position, a trunnion journaled in the hub, a toothed disk mounted on the trunnion, a second trunnion journaled in the hub, a second toothed disk mounted on the second trunnion, said second disk bearing against the first named disk, and a gear on each of said trunnions, said gears meshing, whereby said disks are rotated in geared relation, said second disk being cup shaped, and a spring pressed pin in said second trunnion, said pin bearing against the hub, whereby the second disk is pressed against the first disk.

ERNEST H. GARWOOD.

REFERENCES CITED

The following references are of record in the file of this patent:

UNITED STATES PATENTS

| Number | Name | Date |
|---|---|---|
| 773,095 | Olson | Oct. 25, 1904 |
| 1,991,305 | Willits | Feb. 12, 1935 |

FOREIGN PATENTS

| Number | Country | Date |
|---|---|---|
| 496,570 | Great Britain | Nov. 30, 1938 |